United States Patent [19]
Duggal et al.

[11] Patent Number: 5,532,981
[45] Date of Patent: Jul. 2, 1996

[54] METHOD OF INCORPORATING VERTICAL CAVITY SURFACE EMITTING LASERS IN AN ULTRASOUND DETECTOR

[75] Inventors: Anil R. Duggal, Schenectady, N.Y.; Christopher P. Yakymyshyn, Raleigh, N.C.

[73] Assignee: General Electric Company, Schenectady, N.Y.

[21] Appl. No.: 414,834

[22] Filed: Mar. 31, 1995

[51] Int. Cl.$^6$ .................................................. H04R 23/00
[52] U.S. Cl. ............................................................. 367/149
[58] Field of Search ..................................... 367/149, 140; 73/632, 655; 356/256

[56] References Cited

U.S. PATENT DOCUMENTS 4,546,458  10/1985  Cielo et al. ............................. 367/149
5,353,262  10/1994  Yakymyshyn et al. ................. 367/149

OTHER PUBLICATIONS

"Semiconductor Microlasers and Their Applications", R. E. Slusher, Optics and Photonics News/Feb., 1993, pp. 8–17.
"Optical Detection of Ultrasound", Jean–Pierre Monchalin, IEEE Transactions on Ultrasonics, Ferroelectrics, and Frequency Control, vol. UFFC–33, No. 5, Sep. 1986, pp. 485–499.
"Laser Hydrophone", Yu A. Bykovskii, K. B. Dedushenko, A. N. Maneav, Sov. Phys. Acoust. 34(2), Mar.–Apr. 1988, p. 204.

*Primary Examiner*—Daniel T. Pihulic
*Attorney, Agent, or Firm*—R. Thomas Payne; William H. Pittman

[57] ABSTRACT

A method of transmitting the output signal from each pixel of an array of vertical cavity surface emitting lasers (VCSEL's) operatively positioned in an acoustic detector which minimizes the size of interconnects to the different pixels, which uses optical fibers to transport the output signal from each VCSEL pixel to the signal processing assembly. The VCSEL array is fabricated onto an acoustic matching layer which is designed to allow maximum acoustic coupling into the transducer assembly. An acoustic damping layer is employed after the array in order to extinguish the acoustic energy in order to avoid reflections within the transducer. Alternatively, an acoustic reflecting layer can be employed depending on the sensitivity and bandwidth requirements of the application. The frequency modulation of the laser output caused by the acoustic disturbance is then converted into amplitude modulation in a Fabry-Perot cavity array attached to the damping layer. This cavity could also employ a spatial light modulator array or some other tuning element array which would allow feedback to correct for any laser fluctuations at frequencies lower than the acoustic frequency. Finally, an array of fiber optic couplers would couple the amplitude modulated signal to a signal processing assembly.

15 Claims, 3 Drawing Sheets

METHOD OF INCORPORATING VERTICAL CAVITY SURFACE EMITTING LASERS IN AN ULTRASOUND DETECTOR

BACKGROUND OF THE INVENTION

This application is related to commonly assigned U.S. patent application Ser. No. 08/414,833, (RD-23,075) filed Mar. 31, 1995, of AR Duggal et al., filed concurrently herewith, the disclosure of which is hereby incorporated by reference.

This invention relates generally to methods of imaging of acoustic energy, more particularly to methods of imaging of acoustic energy using laser-based ultrasound detection equipment and most particularly to methods of imaging acoustic energy using an array of semiconductor microlaser-based ultrasound detection equipment.

Ultrasound equipment is commonly used in medical imaging and for non-destructive evaluation (NDE) of materials. Ultrasound analysis involve the propagation of energy through solids, liquids, and gases as acoustic waves; typically a pulse of acoustic energy is applied to an object to be imaged and reflected waves of the acoustic pulse are detected and processed for imaging and analysis. The spatial relationship and amplitude of the reflected waves provide information as to the location and nature of structures that reflected the acoustic energy in the object being analyzed.

Piezoelectric transducers are frequently used to generate ultrasound pulses transmitted into the object to be analyzed and to detect reflected waves received at the transducer. Piezoelectric devices require extensive electrical cabling which places practical limits on the number of pixels that can be placed in a transducer array, which in turn limits the resolution of the array.

Specifically, when utilizing piezoelectric transducers for ultrasound equipment used in medical imaging, currently a one-dimensional array of 128 elements or pixels are utilized. The piezoelectric pixels are each independently electrically connected by wires to the signal processing unit which would then process the signals received from the transducers to an imaging. In order to improve the ultrasound image quality, it is desired that a two-dimensional array with, such as, for example, 128×128 transducers/pixels is needed. Due to the complexity of the many wires required to connect the piezoelectric transducers to the signal processor, and the complexity thereof, to utilize piezoelectric transducers is simply too complex.

Optical techniques have also been used for generation and detection of acoustic waves in ultrasound imaging. For example, energy from a laser beam focused on the surface of an object to be examined can generate an acoustic pulse in the object. The return pulse of acoustic energy is typically detected optically through the use of interferometry. A review of such techniques, is provided in the book Laser Ultrasonics—Techniques and Applications by C. B. Scruby and L. E. Drain (IOP Publishing Ltd 1990), which is incorporated herein by reference. Noninterferometric techniques of optical detection of ultrasound include the knife-edge and surface-grating techniques and techniques based on reflectivity and light filters. See "Optical Detection of Ultrasound" by J. P. Monchalin, IEEE Transactions on Ultrasonics, Ferroelectrics, and Frequency Control, UFFC-33, September 1986, which is incorporated herein by reference. These laser-based methods of ultrasound detection are much less sensitive, by several orders of magnitude, than conventional piezoelectric-based methods.

Another laser-based method for detecting sound waves has been suggested in the article "Laser Hydrophone" by Y. A. Bykovskii et al., in *Sov, Phys. Acoust.* 34, p 204, March 1988. In the Bykovskii et al. optical hydrophone, movement of the hydrophone membrane varies the power and / or the phase of a semiconductor laser in the hydrophone to generate changes in the amplitude of an optical signal. The Bykovskii sonar hydrophone is relatively inefficient and thus has low sensitivity.

In a more recent approach to the use of an optical transducer assembly for ultrasound applications, an optical transducer assembly which includes a transducer housing and a signal laser, such as a microcavity laser or a microchip laser that is optically pumped, to detect ultrasound by monitoring the frequency modulation of the laser output caused by the interaction of the ultrasonic disturbance with the laser cavity, was mounted in the transducer housing. This interaction could involve a change in the laser cavity length and/or a change in the index of refraction of the lasing medium. This approach further detailed a scheme using fiber optic cables to reduce the interconnect complexity when using an array of microcavity lasers. The optical frequency generated by the signal laser is modulable (that is, adapted to or capable of being modulated) in correspondence with acoustic energy incident on the transducer assembly. The signal laser comprises an optical cavity in which a lasing medium is disposed, and first and second reflectors that are disposed at respective opposite end surfaces of the optical cavity along an optical path axis of the cavity. The second reflector can alternatively be replaced with a compliant cavity that acts as a Gires-Tournois interferometer. The signal laser is adapted such that acoustic energy incident on the transducer assembly changes the length of a cavity along the optical path axis, or, alternatively, changes the index of refraction in the optical cavity, and such changes result in a substantially linear variation of the optical frequency of light generated by the laser.

In one embodiment, as disclosed in U.S. Pat. No. 5,353,262, assigned to the assignee of the present application, the disclosure of which is herein incorporated by reference, an optical transducer, such as used in an ultrasound system, includes a signal laser which generates an optical signal the frequency of which varies in correspondence with acoustic energy incident on the transducer. An optical cavity in the signal laser is disposed such that incident acoustic energy causes compression and rarefaction of the optical cavity, and this displacement varies optical frequency generated by the laser. A laser pump coupled to the lasing medium is adapted to apply selected levels of excitation energy appropriate to the detection of acoustic pulses. The signal laser alternatively is adapted such that the refractive index of the optical cavity is varied in correspondence with the incident acoustic energy to modulate the optical frequency of the light generated by the signal laser.

In an alternate embodiment, a piezoelectric device is disposed to receive the incident acoustic energy and generate a corresponding electrical signal that is applied to an electro-optic cell in the optical cavity, or alternatively, to conductors to generate an electric field across the lasing medium.

Despite the efforts described above to provide a simpler, more compact ultrasound detection device, a need still exists in medical imaging and nondestructive evaluation (NDE) of materials for an ultrasound transducer interfaced to support equipment which minimizes interconnection complexity. For example, as stated above, current state-of-the-art ultrasound imaging arrays use a linear array of about one hundred separate ultrasound pixels each of which are connected to a separate coaxial cable. Array sizes are currently limited by the complexity of the interconnect cabling. By using an optical interlace between the transducer head and support equipment, cabling can be significantly reduced in size for the same number of pixels. Alternatively, a much larger number of pixels can be connected by the same size cable. Additionally, it would be advantageous for NDE and underwater acoustic sensing applications to be able to detect as wide a frequency bandwidth of acoustic signals as possible. Finally, ultrasonic microscopic imaging of biological and micro-electronic structures requires an array of small, high bandwidth ultrasonic detectors in contact with the sample being imaged.

SUMMARY OF THE INVENTION

The method of transmitting the output signal from each pixel of an array of vertical cavity surface emitting lasers (VCSEL's) operatively positioned in an acoustic detector which minimizes the size of interconnects to the different pixels utilizing an ultrasound/vibration detector array comprising an electrically pumped vertical cavity surface emitting laser (VCSEL) array is disclosed. The cavity length of each laser or pixel of the array is modulated by the acoustic field at the point where the acoustic field contacts the pixels. The resulting laser output is frequency modulated by the acoustic field. This modulation is converted to amplitude modulation at the detector head and then either detected with a charge-coupled-device (CCD) array with the information being electrically communicated to the signal processing assembly or sent directly by optical fiber to the signal processing assembly for processing. Such ultrasound/vibration detector array provides high frequency bandwidth detection, fine spatial resolution, and minimal electric cabling.

One method of the present invention includes, a method of transmitting the output signal from each pixel of an array of vertical cavity surface emitting lasers (VCSEL's) operatively positioned in an acoustic detector which minimizes the size of interconnects to the different pixels, the method comprising the steps of: fabricating an array of VCSEL's on an acoustic matching layer, the acoustic matching layer being designed for allowing maximum acoustic coupling; providing maximum acoustic sensitivity and/or frequency bandwidth; converting the VCSEL array output into amplitude modulation; and sending the amplitude modulation signal to a signal processing assembly by an array of fiber optic couplers operatively connected to the signal processing assembly.

Another method of the present invention includes, a method of transmitting the output signal from each pixel of an array of vertical cavity surface emitting lasers (VCSEL's) operatively positioned in an acoustic detector which minimizes the size of interconnects to the different pixels, the method comprising the steps of: fabricating an array of VCSEL's on an acoustic matching layer, the acoustic matching layer being designed for allowing maximum acoustic coupling; extinguishing the acoustic energy in order to avoid reflection within the detector; converting the VCSEL array output into amplitude modulation by a Fabry-Perot cavity operatively connected to an acoustic layer; and sending the amplitude; modulation signal to a signal processing assembly.

A still further method of the present invention includes, a method of transmitting the output signal from each pixel of an array of vertical cavity surface emitting lasers (VCSEL's) operatively positioned in an ultrasonic microscope, the method comprising the steps of: fabricating an array of VCSEL's on an acoustic matching layer, the acoustic matching layer being designed for allowing maximum acoustic coupling; providing maximum acoustic sensitivity and/or frequency bandwidth; modulating the optic beams generated by the VCSEL array by an incident ultrasonic field; converting the VCSEL array output into amplitude modulation by a Fabry-Perot cavity array operatively connected to an acoustic backing layer; convening the Fabry-Perot cavity array output into an electrical output signal; and sending the electrical output signal to a signal processing assembly by an array of fiber optic couplers operatively connected to the signal processing assembly.

It is accordingly an object of the present invention to provide a method which utilizes a semiconductor laser detector for detecting acoustic energy.

It is another object of the present invention to provide a method of transmitting the output signal from each pixel of an array of vertical cavity surface emitting lasers (VCSEL's) operatively positioned in an acoustic detector which minimizes the size of interconnects to the different pixels.

Other objects and advantages of the invention will be apparent from the following description, the accompanying drawings and the appended claims.

DETAILED DESCRIPTION OF THE INVENTION

Figure 1:
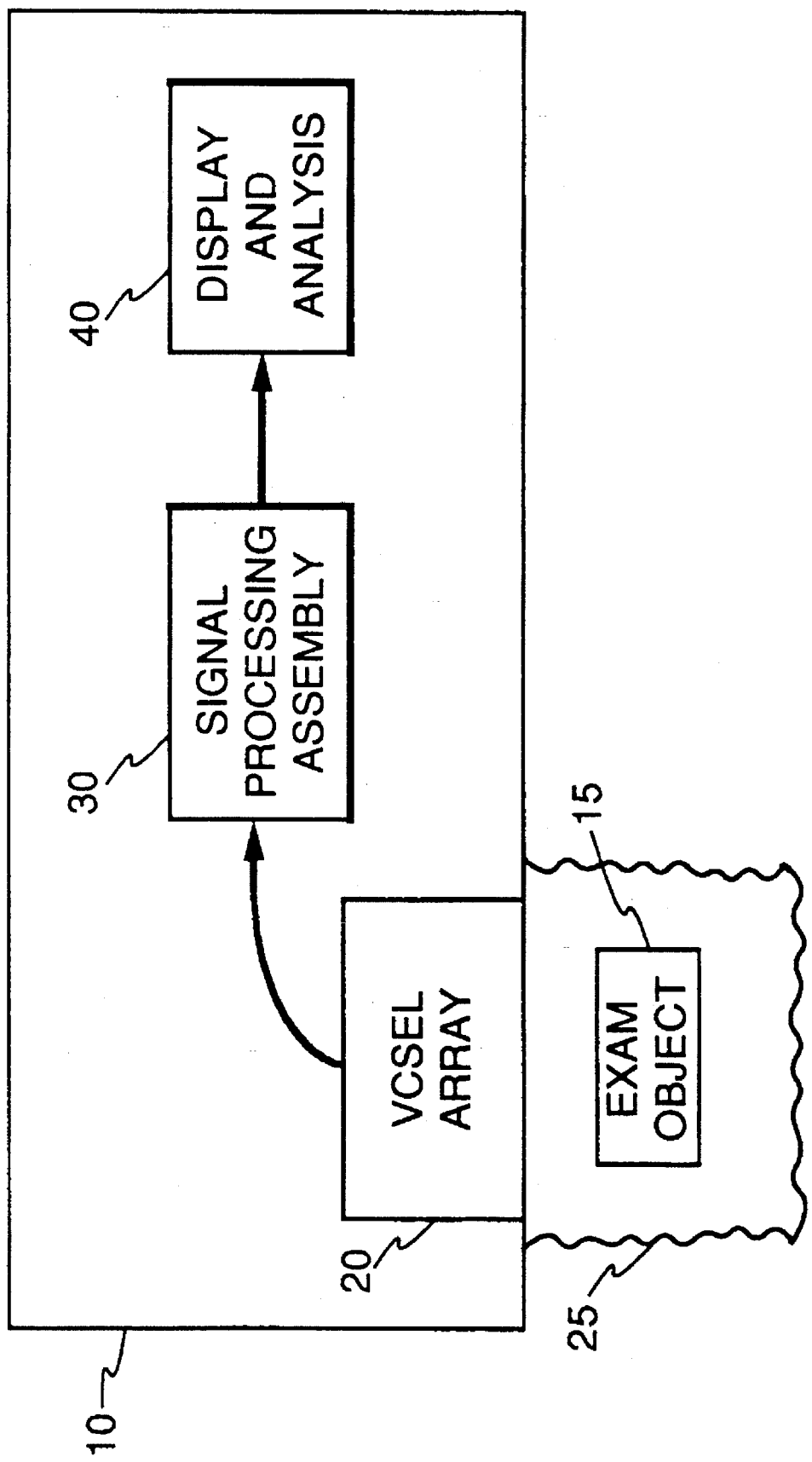
FIG. 1 is a block diagram of an ultrasound system comprising the present invention.

FIG. 1 illustrates an ultrasound system 10 for analyzing an examination object 15 with acoustic energy comprising a detector 20, a signal processing assembly 30, and a display and analysis module 40. Detector 20 is acoustically coupled to object 15 through an acoustic couplant or matching layer 25 such that acoustic energy reflected from or transmitted through object 15 is received by detector 20.

In accordance with the present invention, detector 20 is adapted so that acoustic energy incident on the detector modulates the cavity length of each pixel of the electrically pumped vertical cavity surface emitting laser (VCSEL) array. This modulation is converted to optical frequency modulation of each pixel of the electrically pumped VCSEL which is in turn converted to optical amplitude modulation for each pixel. Detector 20 is in turn operatively connected to signal processing assembly 30 such that a processed output signal corresponding to the received acoustic energy is generated. Display and analysis module 40 is operatively connected to processing assembly 30 so that the processed output signal is visually presented or otherwise analyzed.

The present invention utilizes an array of vertical cavity surface emitting lasers (VCSEL's) or semiconductor microlasers to detect ultrasound by means of monitoring the frequency modulation of the laser output due to the interaction of the ultrasonic disturbance with each individual laser cavity. Each VCSEL array may contain, for example, about ten (10) to about ten thousand (10,000) or more individual microlasers or pixels as may be required or as can be fabricated by semiconductor processing methods.

Currently, considerable scientific research is being conducted in the characterization and improvement of VCSEL's. A useful description of the state of the art can be found in recent publications, one by Jewell et. al. "Vertical-Cavity Surface-Emitting Lasers: Design, Growth, Fabrication, Characterization", IEEE Journal of Quantum Electronics, 27 (1991) p. 1332 and one by Slusher "Semiconductor Microlasers and Their Applications", Optics & Photonics News, February 1993, p.8, the disclosure of each is incorporated herein by reference.

VCSEL's can be incorporated in acoustic detectors by a plurality of various arrangements. For example, two possible arrangements of incorporating VCSEL's in an acoustic detector in order to minimize electrical interconnects for the different pixels are shown schematically in FIGS. 2 and 3.

Figure 2:
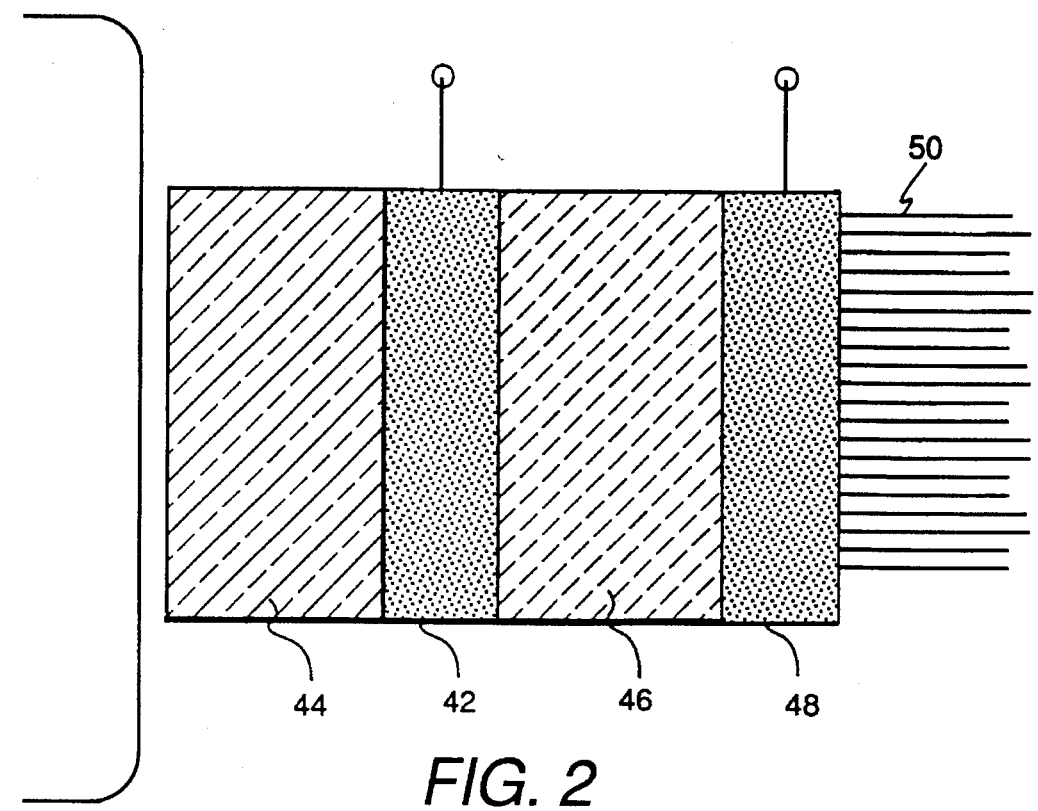
FIG. 2 is a schematic diagram of an optical detector illustrating one embodiment of the present invention.

FIG. 2 illustrates one possible arrangement for detector 20 which uses optical fibers to communicate the output signal from each VCSEL pixel to the signal processing assembly. In this arrangement, the VCSEL array 42 is fabricated onto an acoustic matching layer 44 which is designed to allow maximum acoustic coupling into the detector assembly. An acoustic damping layer 46 is employed after the array 42 for extinguishing the acoustic energy in order to avoid reflections within the detector. Alternatively, an acoustic reflecting layer can be employed in place of the damping layer 46, depending on the sensitivity and bandwidth requirements of the specific application.

The frequency modulation of the laser output caused by the acoustic disturbance is then converted into amplitude modulation in a Fabry-Perot cavity array 48 attached to the damping layer 46. This cavity array 48 could also employ a spatial light modulator array or some other tuning element array which would allow feedback to correct for any laser fluctuations at frequencies lower than the acoustic frequency. Finally, an array of fiber optic couplers 50 would couple the amplitude modulated signal to the signal processing assembly 30.

Figure 3:
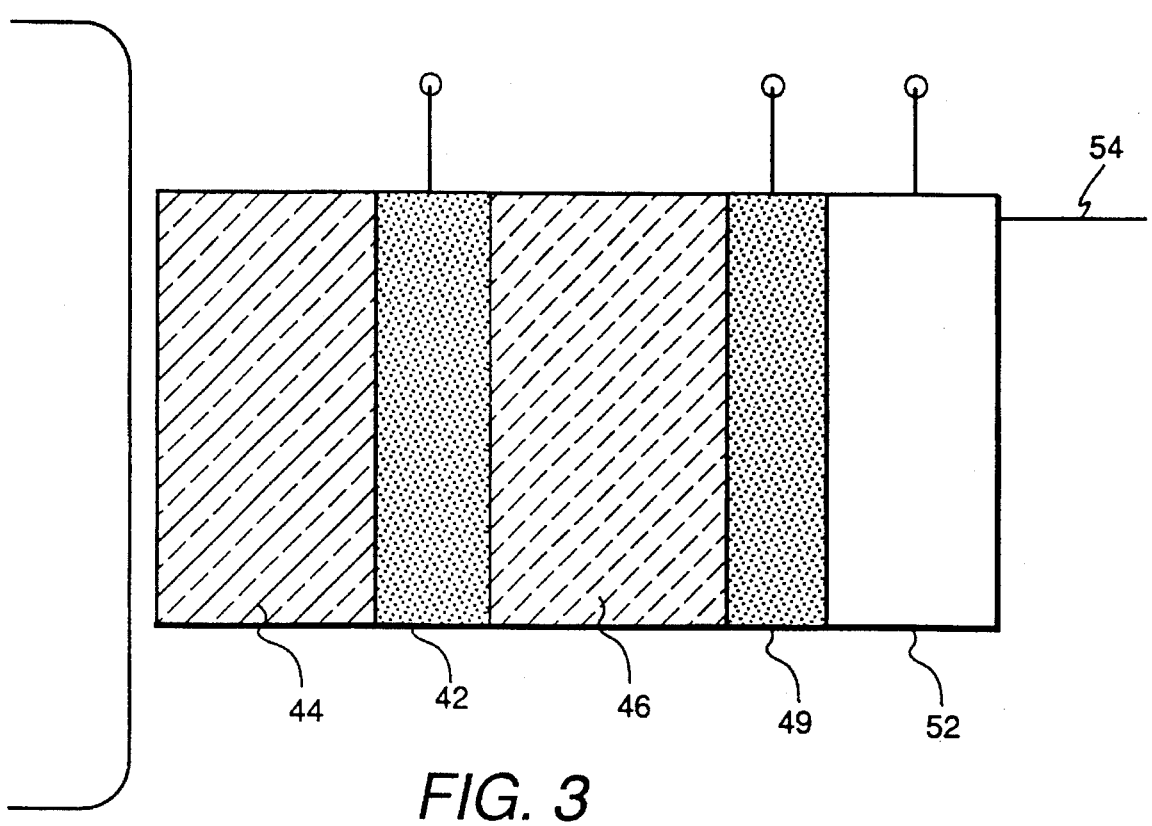
FIG. 3 is a schematic diagram of an optical detector illustrating another embodiment of the present invention.

FIG. 3 illustrates a detector 20 arrangement which eliminates the need for the fiber optic bundle 50 to carry the signal information to the signal processing assembly 30. This arrangement is similar to that illustrated in FIG. 2 except that the optical information is converted to electrical information at the detector head using a charge-coupled-device (CCD) array 52. By using a CCD or a combination of a few CCD's to image all the pixels, all the light-amplitude modulation information can be communicated back to the signal processing assembly 30 using only 1 or, at most, a few signal lines 54. In order to accomplish this, the CCD frame rate must be fast compared to the acoustic frequency. Current state of the ad CCD arrays have frame rates of greater than 100 KHz. Such CCD arrays should provide for successful analysis of acoustic frequencies up to about 50 KHz.

If the signal transmission rate from the CCD is high enough, it might be necessary to replace the electrical signal lines 54 with an optical fiber using techniques known in the art of fiber optic communications in order to send the information to the signal processing assembly 30.

Figure 4:
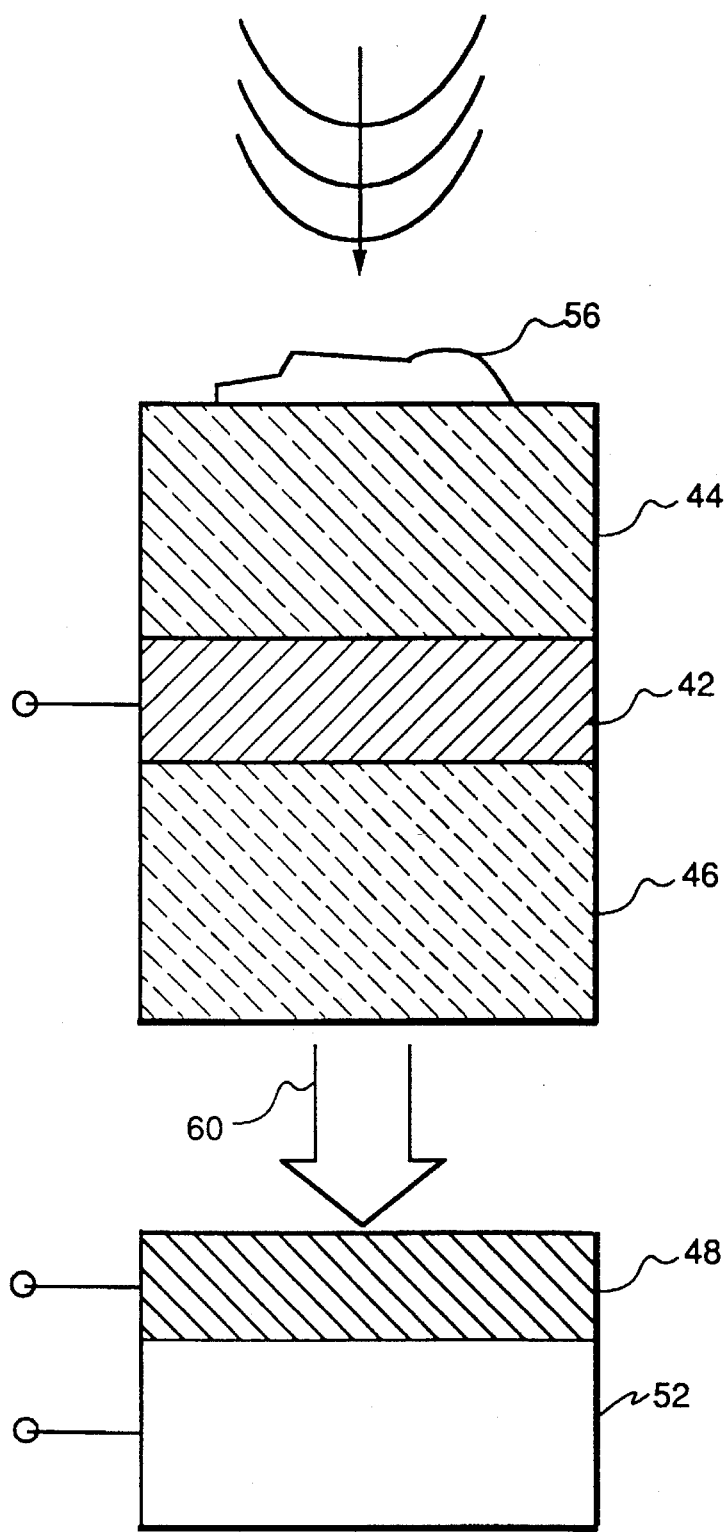
FIG. 4 is a schematic diagram of an optical detector illustrating yet a further embodiment of the present invention.

FIG. 4 illustrates one possible arrangement for an ultrasonic microscope. A sample 56 to be imaged is in acoustic contact with the VCSEL array 42 by an acoustic impedance matching layer 44. The VCSEL array 42 generates an array of optical beams 60 whose optical frequencies are modulated by the incident ultrasonic field. An acoustic damping layer 46 is employed after the array 42 for extinguishing the acoustic energy in order to avoid reflections within the detector. Alternatively, an acoustic reflecting layer can be employed in place of the damping layer 46, depending on the sensitivity and bandwidth requirements of the specific application. The beams 60 are propagated to the previously described Fabry-Perot cavity array 48 and CCD array 52. The high frequency capability of a VCSEL allows high ultrasonic frequencies to be used resulting in superior spatial imaging resolution.

Detectors, in accordance with the present invention, are advantageously used in acoustic energy imaging systems such as ultrasound systems used for medical imaging or for non-destructive evaluation of materials, for ultrasonic microscopy and for undersea acoustic sensing.

The two most important distinguishing points for the purposes of the present invention are: (1) that an array of VCSEL's can be fabricated with a surface area for each laser or pixel on the order of about 10 microns squared and a cavity length on the order of about a few microns and (2) the lasers can be electrically pumped. The first distinguishing point implies that VCSEL acoustic detection allows extremely small pixels for two dimensional sensing arrays. Additionally, it can be shown that, for certain acoustic impedance matching layer combinations, the acoustic frequency detection bandwidth increases as the detecting laser cavity length decreases when the detection interaction involves a change in laser cavity length and the condition that the cavity length be much smaller than the acoustic wavelength holds. Thus, the small VCSEL cavity length leads to a high acoustic frequency detection bandwidth. The second point implies that the whole array can be powered by only two electrical lines.

While the methods contained herein constitute preferred embodiments of the invention, it is to be understood that the invention is not limited to these precise methods, and that changes may be made therein without departing from the scope of the invention which is defined in the appended claims.

What is claimed is:

1. A method of transmitting the output signal from each pixel of an array of vertical cavity surface emitting lasers (VCSEL's) operatively positioned in an acoustic detector which minimizes the size of interconnects to the different pixels, the method comprising the steps of:

fabricating an array of VCSEL's on an acoustic matching layer, the acoustic matching layer being designed for allowing maximum acoustic coupling;

providing maximum acoustic sensitivity and/or frequency bandwidth;

converting the VCSEL array output into amplitude modulation; and sending the amplitude modulation signal to a signal processing assembly by an array of fiber optic couplers operatively connected to the signal processing assembly.

2. The method of claim 1, wherein the converting step is performed by a Fabry-Perot cavity array operatively connected to an acoustic layer.

3. The method of claim 1, wherein the providing step is performed by an acoustic damping layer employed after the VCSEL array.

4. The method of claim 1, wherein the providing step is performed by an acoustic reflecting layer employed after the VCSEL array.

5. The method of claim 1, further comprising the steps of:

prior to sending the amplitude modulation signal to the signal processor assembly, converting the amplitude modulated signal into an electrical signal.

6. The method of claim 5, wherein the amplitude modulated converting step is performed by a charge-coupled-device (CCD) array operatively connected to the Fabry-Perot cavity array.

7. A method of transmitting the output signal from each pixel of an array of vertical cavity surface emitting lasers (VCSEL's) operatively positioned in an acoustic detector which minimizes the size of interconnects to the different pixels, the method comprising the steps of:

fabricating an array of VCSEL's on an acoustic matching layer, the acoustic matching layer being designed for allowing maximum acoustic coupling;

providing maximum acoustic sensitivity and/or frequency bandwidth;

converting the VCSEL array output into amplitude modulation by a Fabry-Perot cavity array operatively connected to an acoustic layer; and sending the amplitude modulation signal to a signal processing assembly.

8. The method of claim 7, wherein the amplitude modulation signal is sent to the signal processing assembly by an array of fiber optic couplers operatively connected to the signal processing assembly.

9. The method of claim 8, wherein the providing step is performed by an acoustic damping layer employed after the VCSEL array.

10. The method of claim 8, wherein the providing step is performed by an acoustic reflecting layer employed after the VCSEL array.

11. The method of claim 8, further comprising the steps of:

prior to sending the amplitude modulation signal to the signal processor assembly, converting the amplitude modulated signal into an electrical signal.

12. The method of claim 11, wherein the amplitude modulated converting step is performed by a charge-coupled-device (CCD) array operatively connected to the Fabry-Perot cavity array.

13. A method of transmitting the output signal from each pixel of an array of vertical cavity surface emitting lasers (VCSEL's) operatively positioned in an ultrasonic microscope, the method comprising the steps of:

fabricating an array of VCSEL's on an acoustic matching layer, the acoustic matching layer being designed for allowing maximum acoustic coupling;

providing maximum acoustic sensitivity and/or frequency bandwidth;

modulating the optic beams generated by the VCSEL array by an incident ultrasonic field;

converting the VCSEL array output into amplitude modulation by a Fabry-Perot cavity array operatively connected to an acoustic layer;

converting the Fabry-Perot cavity array output into an electrical output signal; and sending the electrical output signal to a signal processing assembly by an array of fiber optic couplers operatively connected to the signal processing assembly.

14. The method of claim 13, wherein in the providing step is performed by an acoustic damping layer employed after the VCSEL array.

15. The method of claim 13, wherein the providing step is performed by an acoustic reflecting layer employed after the VCSEL array,

* * * * *